(No Model.) 2 Sheets—Sheet 2.
B. PEARSON.
FAUCET.
No. 560,749. Patented May 26, 1896.
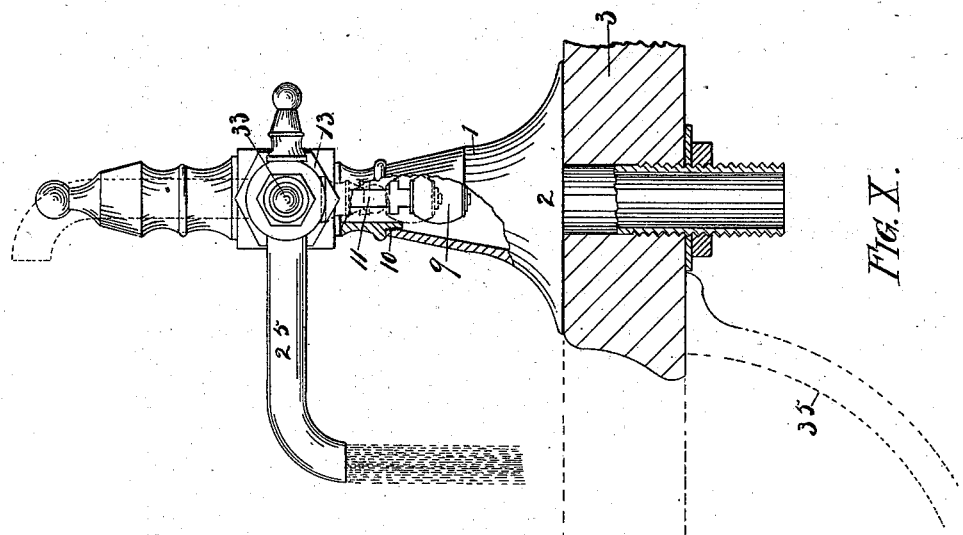
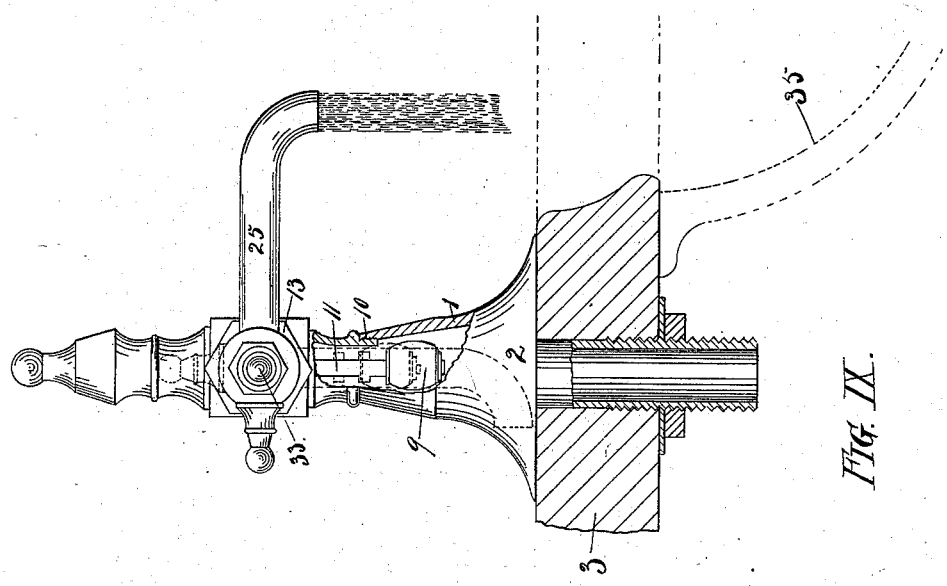
WITNESSES:
Geo. R. Howard Jr.
Walter E. Allen.
INVENTOR
B. Pearson.
BY
ATTORNEYS

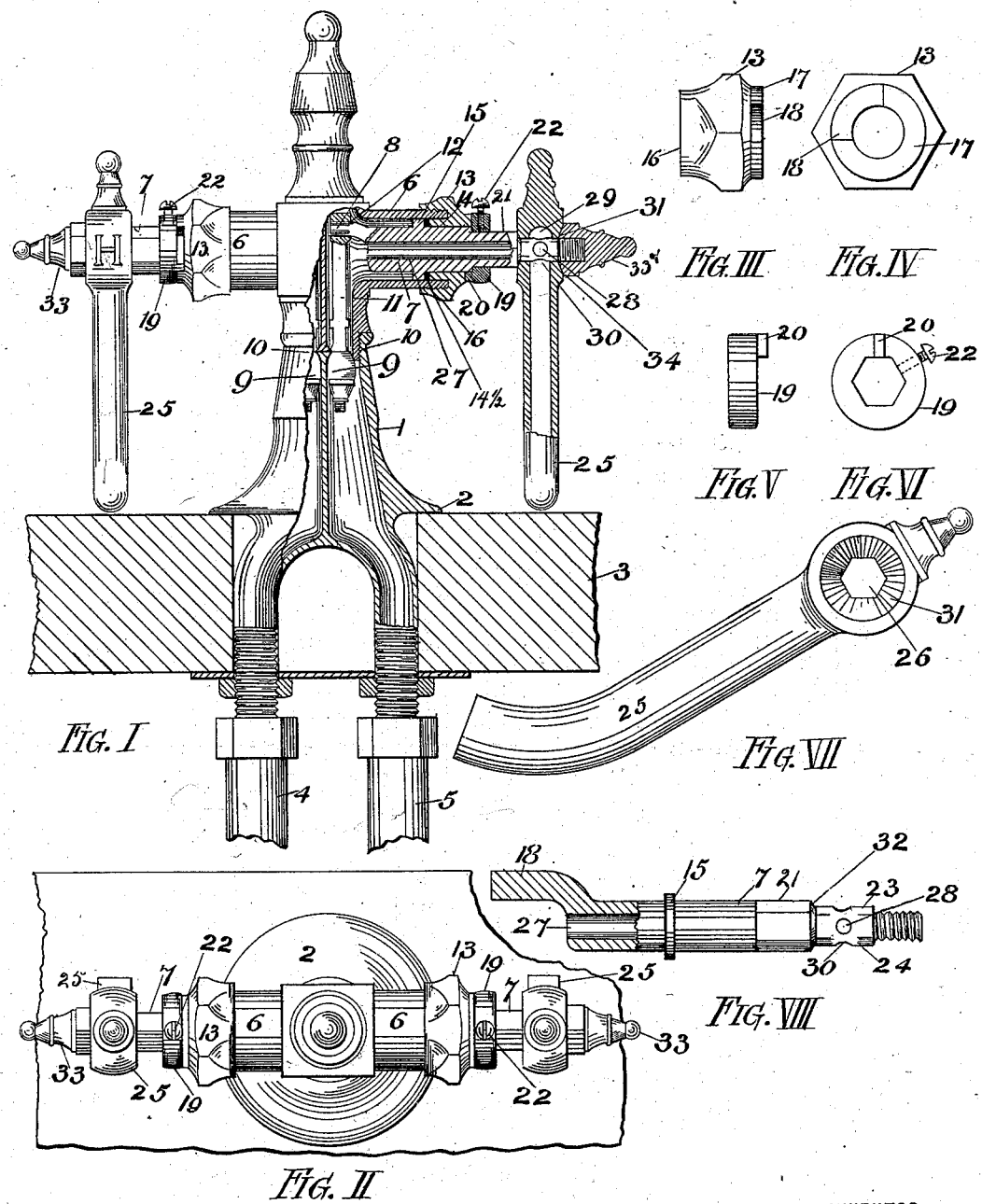

UNITED STATES PATENT OFFICE.

BENJAMIN PEARSON, OF REDLANDS, CALIFORNIA.

FAUCET.

SPECIFICATION forming part of Letters Patent No. 560,749, dated May 26, 1896.

Application filed April 24, 1895. Serial No. 547,037. (No model.)

*To all whom it may concern:*

Be it known that I, BENJAMIN PEARSON, of Redlands, in the county of San Bernardino and State of California, have invented certain new and useful Improvements in Faucets, of which the following is a full, clear, and exact description, reference being had to the accompanying drawings, which form a part of this specification.

My invention relates to certain new and useful improvements in faucets; and my invenvention consists in certain features of novelty hereinafter described and claimed.

Figure I is in part a front elevation and in part a vertical section of my improved faucet. Fig. II is a top view. Fig. III is a side elevation of a recessed nut that limits the sweep of the discharge-spout. Fig. IV represents an end view of said nut. Fig. V is a side view of an adjustable collar that engages the recessed nut. Fig. VI is an end view of said collar. Fig. VII is a side view of the discharge-spout. Fig. VIII represents a side view of the valve-operating spindle and a sectional view of the eccentric-pin to which the valve-stem may be attached. Fig. IX represents a side and broken view of the single faucet in which the valve is closed by pressing the discharge-spout downward. Fig. X is a similar view, but in which the valve is closed by pressing the spout upward.

Referring to the drawings, 1 represents the ordinary combination supply-pipe having a flange 2, which rests on the top 3 of a washstand 4. (Not shown.)

5 represents the hot and cold water supply-pipes and 6 the right and left horizontal cylinders, through which the hot and cold water, respectively, is discharged.

7 represents the valve-operating spindle, which is partly located within the cylinder 6 and has on its inner end an eccentric-pin 8.

9 represents the valve having its seat at 10 within the pipe 1.

11 represents the valve-stem having its opposite end journaled at 12 to the eccentric-pin 8.

13 represents a nut having an inner collar 14, which presses against packing 14½, which packing abuts against a flange 15, thus forming an adjustable water-tight connection, and an outer screw-threaded collar 16, that screws onto the outer end of the cylinder 6, the spindle 7 being thus securely held in place in the cylinder. The outer end of the nut 13 is provided with a collar 17, having a recess 18.

19 represents an adjustable collar having its cavity of hexagon shape and with a lug 20, extending out from its side. After the nut 13 has been placed in position the collar 19 is placed on the spindle 7, which is provided at that point with a reduced hexagon surface 21, which corresponds with the cavity of the collar, the lug 20 entering into the recess 18 in the nut 13 and the collar held from longitudinal movement by means of a set-screw 22. As the spindle 7 is rotated the lug 20 will limit its rotation in either direction within certain limits, which may be changed at will by adjusting the nut 13. The outer end of the spindle 7 is further reduced, as shown at 23, and is provided with a hexagon surface 24, on which a curved discharge hollow spout 25, with corresponding hexagon-shaped orifice 26, is placed. The spindle 7 has a longitudinal orifice 27, which connects at its inner end with the supply-pipe and has at its outer end transverse orifices 28, which connect with the orifice 27. The orifices 28 register with the orifice in the hollow spout, therefore permitting the water to run when the outer end of the spout has been raised, causing the spindle 7 to turn, and thus opening the valve 9.

29 represents a curved groove in the discharge-spout and 30 a similar groove in the spindle 7, thus permitting the water to flow from all the orifices 28 at once and insuring a constant flow of the same. The discharge-spout where it is fitted to the spindle 7 has a concave-ground surface 31, and the spindle 7 has a convex-ground shoulder 32, against which the spout abuts, the nut 33, which holds the spout on the spindle, also having a ground convex inner end 34, thus insuring a water-tight connection between the discharge-spout and spindle. It will be noted that the spout can be set at any angle on the spindle, owing to its hexagon connection. Thus, if desired, for instance, in barber-shops, the spout could be so set as to point upward, instead of downward, when the valve is closed, and by depressing it the valve will be opened and the water permitted to flow. (See Fig. X.) In either event the spout does not remain extending over the washbowl 35 or other vessel when the water is not running, (see dotted lines, Figs. IX and X,) leaving the bowl entirely free from any obstruction.

I have shown my device as used for both hot and cold water combined, (see Fig. I;) but of course the faucets may be used singly, if desired, as shown in Figs. IX and X.

I claim as my invention—

1. In a faucet the combination of a suitable hollow body, a hollow valve-operating spindle, a nut for securing the spindle to the body, said nut having a recess, a discharge-spout connected with the spindle, an adjustable collar on the spindle and a lug on the collar, operating in the recess on the nut, substantially as set forth.

2. In a faucet the combination of a hollow body, a hollow spindle, a hollow spout adjustably secured to the spindle, a convex shoulder on the spindle, a concave surface on the discharge-spout adjacent to said shoulder, a nut having a convex end and a concave surface on the spout adjacent to said nut, substantially as set forth.

BENJAMIN PEARSON.

Witnesses:
R. H. KENDELL,
L. W. CLARK.